US012578714B2

(12) United States Patent
Anicic

(10) Patent No.: US 12,578,714 B2
(45) Date of Patent: Mar. 17, 2026

(54) GATEWAY AND METHOD FOR TRANSFORMING A DATA MODEL OF A MANUFACTURING PROCESS EQUIPMENT

(71) Applicant: Siemens Aktiengesellschaft, Munich (DE)

(72) Inventor: Darko Anicic, Munich (DE)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 354 days.

(21) Appl. No.: 18/341,595

(22) Filed: Jun. 26, 2023

(65) Prior Publication Data

US 2024/0012403 A1 Jan. 11, 2024

(30) Foreign Application Priority Data

Jun. 30, 2022 (EP) ..................................... 22182139

(51) Int. Cl.
*G05B 19/418* (2006.01)

(52) U.S. Cl.
CPC .................. *G05B 19/41885* (2013.01); *G05B 2219/33002* (2013.01)

(58) Field of Classification Search
USPC ....................................................... 700/104
See application file for complete search history.

(56) References Cited

U.S. PATENT DOCUMENTS

2011/0125874 A1    5/2011  Park .............................. 709/219
2018/0067732 A1*   3/2018  Seetharaman ........ G06F 8/4452
(Continued)

FOREIGN PATENT DOCUMENTS

EP          2772877 A1 *  9/2014  .......... G06Q 10/067
EP          3001266 A1 *  3/2016  ............ G05B 17/02
KR     2011 0054370       6/2011  ............ H04L 12/28

OTHER PUBLICATIONS

Banerjee et al. "A Software Framework for Procedural Knowledge", IEEE, 2019, p. 41-48. based Collaborative Data Analytics for IoT (Year: 2019).*

(Continued)

*Primary Examiner* — Hien D Khuu
(74) *Attorney, Agent, or Firm* — Slayden Grubert Beard PLLC

(57) ABSTRACT

Various embodiments include a gateway for transforming a data model of a manufacturing process equipment into an industrial information model for automation purposes. The gateway may include: a parsing module for parsing information entities in the data model of the manufacturing process equipment applying a communication protocol of the data model; a semantic mapping engine for transforming the information entities into the industrial information model, the semantic mapping engine using a runtime environment for executing knowledge-based mapping rules; an interface module for providing access to the industrial information model; a mapping knowledge unit including a mapping rule base for maintaining one or more declarative mapping rules; and a mapping compiler for transforming the declarative mapping rules into executable code, for compiling the executable code into knowledge-based mapping rules and for feeding the knowledge-based mapping rules into the runtime environment of the semantic mapping engine.

6 Claims, 3 Drawing Sheets

(56) References Cited

U.S. PATENT DOCUMENTS

| | | | |
|---|---|---|---|
| 2019/0327346 A1* | 10/2019 | Zeng ................. | G05B 19/4186 |
| 2020/0210869 A1* | 7/2020 | Anicic ................. | G06F 16/289 |

OTHER PUBLICATIONS

Search Report for EP Application No. 22182139.0, 7 pages, Dec. 7, 2022.

Vu Van Tan et al: "Device Integration Approach to OPC UA-Based Process Automation Systems with FDT/DTM and EDDL"; Emerging Intelligent Computing Technology and Applications. With Aspects of Artificial Intelligence; Springer Berlin Heidelberg, Berlin, Heidelberg; pp. 1001-1012, Sep. 16, 2009.

Reboredo Pedro et al: "Integration of discrete manufacturing field devices data and services based on OPC UA", IECON 2013—39th Annual Conference of the IEEE Industrial Electronics Society, IEEE, pp. 4476-4481, Nov. 10, 2013.

* cited by examiner

FIG 3

MRS

GTW

RRC EVC

EPT

MCH

FIG 4

MPR

PMM CFX

GATEWAY AND METHOD FOR TRANSFORMING A DATA MODEL OF A MANUFACTURING PROCESS EQUIPMENT

CROSS-REFERENCE TO RELATED APPLICATIONS

This application claims priority to EP Application No. 22182139.0 filed Jun. 30, 2022, the contents of which are hereby incorporated by reference in their entirety.

TECHNICAL FIELD

The present disclosure relates to transformation of a data model of a manufacturing process equipment into an industrial information model for automation purposes. Various embodiments of the teachings herein include gateways for transforming a data model of a manufacturing process equipment into an industrial information model for automation purposes.

BACKGROUND

Industrial automation system components of the past have traditionally been interconnected by specialized networks using a variety of different protocols for access and data exchange. The development of present and future automation systems and manufacturing process equipment has put considerable focus on common industry standards aiming for a standardized access to process data in order to reduce the effort for device-engineering, configuration, management, operation, and versioning, as well as enable applications that are based on integration and processing of the process data. Industrial information models for automation purposes provide for an architecture for seamless integration of automation devices.

Many manufacturing process equipment of today, however, are still described or controlled by a proprietary or legacy data model and are therefore also referred to as brownfield devices.

SUMMARY

Teachings of the present disclosure may be used to facilitate an integration of brownfield devices and other legacy manufacturing process equipment into an environment of contemporary industrial information models. Various embodiments include a flexible solution that may be executed on a low-resource runtime environment, and on the other hand may be adapted to a large number of brown-field devices without fundamental architectural software changes.

As an example, some embodiments of the teachings herein include a gateway for transforming a data model of a manufacturing process equipment into an industrial information model for automation purposes, the gateway including: a parsing module (PAM) for parsing information entities in the data model of the manufacturing process equipment applying a communication protocol of the data model; a semantic mapping engine (ENG) for transforming the information entities into the industrial information model, the semantic mapping engine using a runtime environment for executing knowledge-based mapping rules; an interface module (IFM) for providing access to the industrial information model; a mapping knowledge unit (MKU) including a mapping rule base (MKB) for maintaining one or more declarative mapping rules; and a mapping compiler (MPC) for transforming the declarative mapping rules into executable code, for compiling the executable code into knowledge-based mapping rules and for feeding the knowledge-based mapping rules into the runtime environment of the semantic mapping engine (ENG).

In some embodiments, the mapping knowledge unit includes a generation module (GNM) for generating or assisting a generation of mapping knowledge by artificial intelligence and/or by human operators.

In some embodiments, the mapping knowledge unit includes a mapping knowledge transformation module (TRM) for transforming the mapping knowledge into declarative logic facts and for asserting the declarative logic facts within a deductive database.

In some embodiments, the mapping knowledge unit includes a transformation unit for transforming the parsed information entities into declarative logic facts and for asserting the declarative logic facts within a deductive database.

In some embodiments, the industrial information model is IPC-CFX or OPC UA.

As another example, some embodiments include a method for transforming a data model of a manufacturing process equipment into an industrial information model for automation purposes, the method including: parsing information entities in the data model of the manufacturing process equipment by applying a communication protocol of the data model; transforming the information entities into the industrial information model using a runtime environment for executing knowledge-based mapping rules; providing access to the industrial information model by an interface module (IFM); maintaining one or more declarative mapping rules by a mapping knowledge unit (MKU) including a mapping rule base (MKB); and transforming the declarative mapping rules into executable code, compiling the executable code into knowledge-based mapping rules, and feeding the knowledge-based mapping rules into the runtime environment of the semantic mapping engine (ENG).

BRIEF DESCRIPTION OF THE DRAWINGS

The drawings illustrate generally, by way of example, but not by way of limitation, various embodiments discussed in the present document. In the drawings, reference signs may have been repeated among the figures to indicate corresponding elements.

FIG. 3: is a block diagram illustrating an exemplary industrial communication environment incorporating teachings of the present disclosure;

FIG. 4: is a block diagram illustrating mutual dependencies in the transformation of a communication protocol and an information model;

DETAILED DESCRIPTION

Embodiments herein generally involve a gateway for transforming a data model of a manufacturing process equipment into an industrial information model for automation purposes. The gateway may include:

- a parsing module for parsing information entities in the data model of the manufacturing process equipment by applying a communication protocol of the data model;
- a semantic mapping engine for transforming the information entities into the industrial information model, the semantic mapping engine using a runtime environment for executing knowledge-based mapping rules;
- an interface module for providing access to the industrial information model;
- a mapping knowledge unit including a mapping rule base for maintaining one or more declarative mapping rules; and
- a mapping compiler for transforming the declarative mapping rules into executable code, for compiling the executable code into knowledge-based mapping rules and for feeding the knowledge-based mapping rules into the runtime environment of the semantic mapping engine.

The teachings of the present disclosure enable mapping of an existing and/or propriety data model of a machine vendor into a standardized industrial information model for automation purposes. Although there may be many ways to implement a mapping of data models, the proposed embodiments are particularly suited for an implementation on hardware with limited resources, for example a gateway being located on an edge layer. This is due to the semantic mapping engine using a runtime environment. The runtime environment allows for an execution of knowledge-based mapping rules instead of interpreting declarative mapping rules, thereby saving processing time and resources due to the executable character of the knowledge-based mapping rules. Interpreting the non-executable declarative mapping rules instead would require more overhead, lowering operational efficiency The teachings herein provide for universality to be adaptable to any data model, including propriety data models, legacy data models, machine-specific data models and vendor-specific data models. This universality is accomplished by a declarative semantic mapping. In addition to the execution of knowledge-based mapping rules, the proposed gateway may also perform an interpretation of declarative semantic mapping. As a result, the gateway can be adapted to any machine model and does not have to be changed as a result of an exchanged machine. It is sufficient to update its semantic mapping. Such a mapping can be generated offline either by humans or/and with methods provided by Artificial Intelligence.

Furthermore, the gateway may be adapted to a multiplicity of machines or process equipment in general and may serve this multiplicity of machines or process equipment at the same time, preferably on an edge level. For this reason, the proposed gateway is not limited to one machine.

Figure 1:
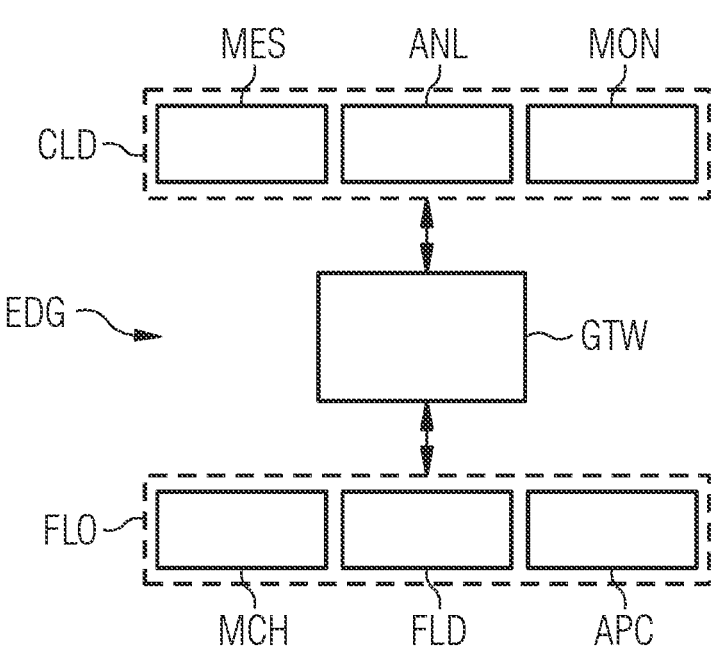
FIG. 1: illustrates an example gateway inside a layered control plane of an industrial automation system.

In some embodiments, a gateway may provide an integration of brownfield devices and other legacy manufacturing process equipment into an industrial automation system. The gateway may be preferably located on an edge layer being part of an industrial automation system. FIG. 1 shows a high-level overview of an exemplary industrial automation system. The system may be organized in layered control planes including a shopfloor layer FLO, an edge layer EDG and a cloud layer CLD.

The shopfloor layer FLO may include a number of industrial devices such as machines MCH, field devices FLD or, more general, automation devices APC. Exemplary machines MCH may include batch control systems, e.g., mixing systems, continuous control systems, e.g., PID control systems, or discrete control systems. Exemplary automation devices APC may include industrial controllers, e.g., programmable logic controllers or other types of programmable automation controllers. Exemplary field devices may include sensors and meters, motor drives, operator interfaces (e.g., human-machine interfaces, industrial monitors, graphic terminals, message displays, etc.), industrial robots, barcode markers and readers, vision system devices or vision cameras, smart welders, systems for assembly manufacturing, etc.

Because of a large number of system variables that must be monitored and controlled in near real-time, industrial automation systems often generate vast amounts of near real-time data. In addition to production statistics, data relating to machine health, alarm statuses, operator feedback—e.g., manually entered reason codes associated with a downtime condition—electrical or mechanical load over time, and the like are often monitored, and in some cases recorded, on a continuous basis. This data is generated by the many industrial devices MCH, FLD, APC on the shopfloor level FLO. Moreover, since many industrial facilities operate on a 24-hour basis, their associated automation systems may generate a vast amount of potentially appropriate data at high rates.

The large quantity of data generated by modern automation systems makes it possible to apply a broad range of plant analytics to the automation system. However, access to the industrial data is typically limited to applications and devices that share a common network with the industrial controllers that collect and generate the data. To address these and other issues, edge devices located on-premise provide a hybrid data collection and analysis infrastructure on the edge level EDG. Edge devices such as gateways GTW may collect data from multiple industrial devices MCH, FLD, APC on the shopfloor level FLO.

In addition, edge devices may maintain a communication channel to a cloud platform or cloud level CLD executing cloud-level data collection and analytic services. As necessary, the edge devices may pass selected sets of data to the cloud platform CLD, where the cloud-level analytic services perform higher level or closed loop analytics ANL and/or Monitoring and Optimization MON on the industrial data. The hybrid architecture operates in a bi-directional manner, allowing a Manufacturing Execution System MES to control the industrial devices MCH, FLD, APC on the shopfloor level FLO and allowing the cloud-level analytic services ANL to send instructions or data values (e.g., setpoint values) to the edge devices based on results of the high-level cloud analytics. In turn, the edge devices can modify aspects of the controlled industrial processes in accordance with the instructions or new data values sent by the cloud platform services.

A current challenge in industrial automation systems such as in the electronics manufacturing industry involves a standardized communication protocol for the exchange of information between the manufacturing processes and the software systems used in a printed circuit board or PCB assembly.

Considering a plethora of disparate equipment platforms and machines used in a typical manufacturing assembly line, it is a tedious task to enable interoperability in electronics manufacturing industry. Interoperability, however, is a key factor in reduction of integration costs when implementing a scenario which is frequently referred to as an Industry 4.0 scenario.

A trade association known as IPC has developed a standard for an information model enabling this desired interoperability. IPC, founded in 1957 as »Institute of Printed Circuits«, nowadays entitled Institute for Interconnecting and Packaging Electronic Circuits is a trade and standardization organization based in Bannockburn, Illinois, USA.

IPC-CFX is an industry-developed open international standard forming the foundation/backbone of Factory of the Future or Industry 4.0 applications. IPC-CFX is a plug-and-play solution that simplifies and standardizes machine-to-machine communication while also facilitating machine-to-business and business-to-machine applications. IPC-CFX is based on IPC-2591, Connected Factory Exchange (CFX), and both are managed by the IPC 2-17 Connected Factory Initiative Subcommittee.

IPC-CFX according to the standard IPC-2591 which aims to enable interoperability in all manufacturing stages for the electronics manufacturing industry, where all equipment, manufacturing processes, and transactional stations may communicate in a unified language.

Quite a lot of existing or brownfield machines nowadays do not implement this IPC-CFX or IPC-2591 standard. The term brownfield refers to state-of-the-art-devices operated by a legacy description language which are to be deployed in a more contemporary environment.

In order to enable Industry 4.0 scenarios—e.g., applications for Enterprise Resource Planning or ERP or applications for Manufacturing Execution Systems or MES, closed loop analytics, efficient condition monitoring etc.—there is a need to enable brownfield machines in order to communicate by the IPC-CFX standard.

The proposed gateway GTW or Knowledge-Based IoT Gateway GTW may be attached to several brown-field machines MCH, devices FLD, and/or automation processes APC in order to map their information to information compliant, e.g., with the IPC-CFX standard. The proposed gateway GTW and the proposed embodiments are, however, not limited to IPC-CFX standard. Rather, they may be used for other industrial standards, e.g., OPC UA standard. The gateway GTW may automatically map messages from proprietary machine vendor models into messages that are compliant with the IPC-CFX standard.

Figure 2:
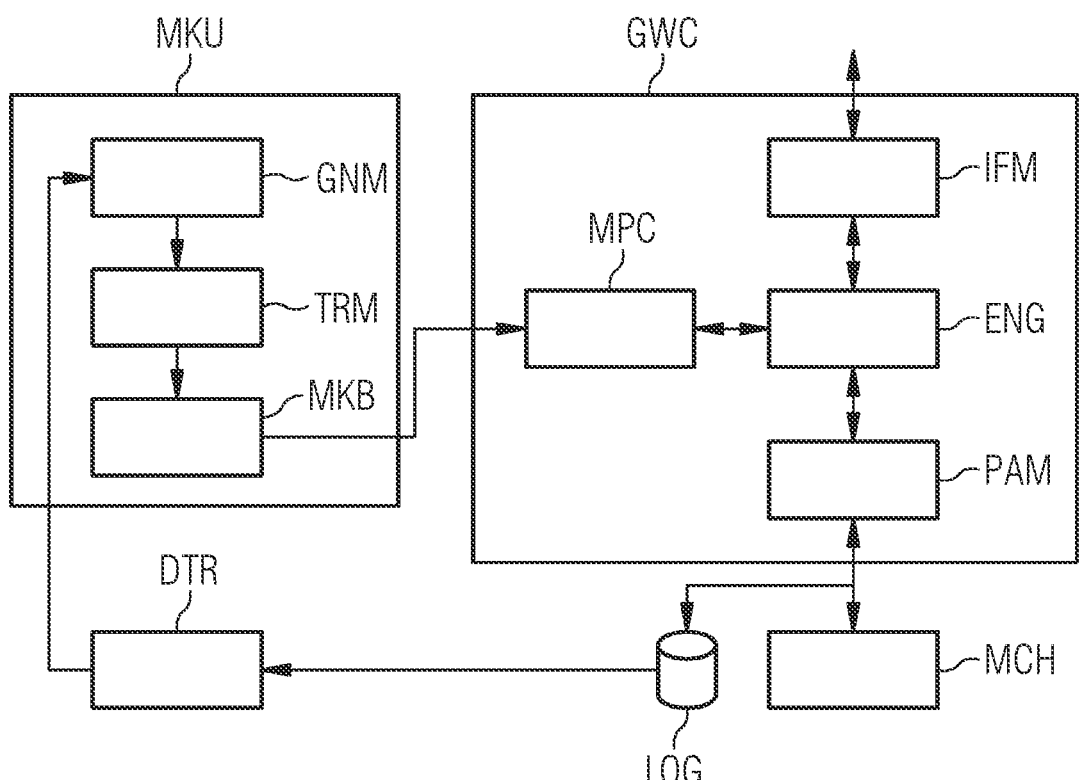
FIG. 2: is a block diagram illustrating an example of a gateway that may implement the disclosed embodiments incorporating teachings of the present disclosure.

As can be seen in FIG. 2, an example embodiment of the proposed gateway consists of two functional areas or units in the following. A first unit or mapping knowledge unit MKU (shown on the left side of FIG. 2) is used to generate the mapping knowledge, whereas a second gateway unit GWC (shown on the right side of FIG. 2) interprets that mapping knowledge in order to realize the gateway functionality, i.e., translates artifacts or messages from one information model into another one. A core of this gateway unit GWC is a semantic mapping engine ENG, which is using or providing a—not shown—runtime environment for executing knowledge-based mapping rules in order to transform information entities in the data model of the manufacturing process equipment into the industrial information model.

The mapping knowledge unit MKU includes a generation module GNM for the generation of mapping knowledge. The process of mapping knowledge may be generated or assisted by artificial intelligence or AI and/or by human operators. The mapping knowledge unit MKU may enable a user to define the mapping knowledge. The user may be supported with AI-based tools in this task. Data of a log database LOG of the machine MCH may be fed-back via an optional data transformation unit DTR into the generation module GNM.

Once specified, the mapping knowledge may be transformed into understandable and interpretable mapping rules. The generation module GNM transfers the specified mapping knowledge to a mapping knowledge transformation module TRM, where the mapping knowledge is transformed into understandable and interpretable mapping rules. The mapping knowledge transformation module TRM transfers the mapping rules to a mapping rule base MKB which may comprise a reservoir for declarative mapping rules, e.g., mapping rules based on Datalog as detailed further down below.

The mapping knowledge transformation module TRM may optionally use an accompanying asserter—not shown—for wrapping extracted information into Datalog facts and asserting the declarative logic Datalog facts within the mapping rule base MKB, e.g. Datalog database MKB. The contents of the mapping rule base MKB may be used for applying mapping rules or mapping knowledge in general to said declarative logic facts using a Datalog Engine.

The mapping rule base MKB may feed declarative mapping rules to a mapping knowledge compiler MPC being a part of the gateway unit GWC. Alternatively, the mapping knowledge compiler MPC may actively fetch declarative mapping rules from the mapping rule base MKB. The mapping knowledge compiler MPC may include a code generator for translating a Datalog program into an executable and/or procedural code. Generated and optionally optimized code may be designed to run on resource-limited and low-cost hardware.

The mapping knowledge unit MKU and/or the mapping rule base MKB may be operated to deductively map information entities in the data model of the manufacturing process equipment within the knowledge base KNB with a structure to allow them to be later extracted as objects of the industrial information model for automation purposes, e.g., IPC-CFX objects. The mapping rules may be asserted before any mappings occur, such that they are able to be applied to input information throughout the transformation or mapping process.

The gateway unit GWC as depicted on the right side of FIG. 2 constitutes the second part of the example gateway. The gateway unit GWC may comprise an interface module IFM, the mapping compiler MPC, a semantic mapping engine ENG and a parsing module PAM.

The parsing module PAM may interface a machine MCH or any other entity on a shop floor level. The parsing module PAM may be arranged for retrieving information entities in the data model of the manufacturing process equipment by applying a communication protocol of the data model. It may be adapted to any vendor specific information model of a machine. For any new machine information model, it is sufficient to update the mapping knowledge in the gateway. One or more parsing modules PAM may be provided for each distinguished serialization format. The parsing modules PAM may be accompanied with a declarative language for selecting and navigating nodes in an input document or input message.

While various embodiments of the gateway are based on declarative mapping rules, engines for these declarative mapping rules may not efficiently run on resource-limited or constrained hardware. The gateway according to the present embodiments, however, aims to achieve low hardware requirements including resource-limited hardware. In order to address this conflict of goals, the proposed gateway features a mapping compiler MPC. This mapping compiler MPC may translate a multiplicity of Datalog rules or a Datalog program into an executable and/or procedural code being executed in the semantic mapping engine ENG. The generated and optimized code may be designed to run on resource-limited and low-cost hardware being part or being assigned to the semantic mapping engine ENG.

The interface module IFM is bidirectionally connecting the semantic mapping engine ENG and interfacing the gateway with a standardized industrial communication in a »northbound« direction, e.g., with a manufacturing execution system MES or other entities on a cloud level CLD according to FIG. 1.

Both units—i.e., the mapping knowledge unit MKU of the proposed gateway as shown on the left side of FIG. 2 and the gateway unit GWC of the proposed gateway as shown on the right side of FIG. 2—are not necessarily realized in one single device. Instead, said units may be designed structurally or factually separate and possibly distributed on a plurality of devices such as field devices, edge devices, gateway devices etc. In fact, all functional units assigned by a reference sign as depicted in FIG. 2 may be realized as separate parts connected via a common communication network.

The gateways described herein are, from an efficiency point of view, equivalent to a machine-level implementation based on execution of a procedural or fix mapping program, e.g., a C++ implementation. The proposed gateway is, however, more flexible than a hard-coded solution. The rules that enable mapping may be learnt with AI techniques or may be defined or improved by humans in a low-code fashion using a low-code development platform.

A low-code development platform in general may provide a development environment used to create application software through a graphical user interface. A low-coded platform may produce entirely operational applications or require additional coding for specific situations. Low-code development platforms may reduce the amount of traditional time spent, enabling accelerated delivery of business applications. A common benefit is that a wider range of people can contribute to the application's development—not only those with coding skills but require a good governance to be able adhere to common rules and regulations. Low-code development platform may also lower the initial cost of setup, training, deployment and maintenance.

A low-code approach incorporating teachings of the present disclosure not only enables an easy creation of declarative mapping knowledge but also eases to discover, modify, validate, and distribute the declarative mapping knowledge. Summing up, the gateway unites advantages of a low-code or Cloud approach with a flexibility and efficiency of a resource-limited low-cost or edge approach.

The gateway features bidirectional protocol bindings for mapping a communication protocol from the parsing modules PAM, e.g., a machine or device specific protocol, into a standard communication protocol at the interface module IFM and vice versa. In the case of IPC-CFX standard, this is IPC-CFX Communication Protocol at the northbound direction. The proposed embodiments, however, are not limited to this IPC-CFX Communication Protocol. The interface module IFM may be adapted to provide many other protocols such as OPC UA. In general, such protocol bindings may be implemented once and may be used for multiple connected machines. Thus, protocol bindings according to the embodiments may be implemented with procedural programing languages.

Although the two-fold nature of the gateway as shown in FIG. 2 is not mandatory for all possible gateways according to the embodiments, the concurrent operation of a mapping knowledge functionality and a gateway functionality including an execution of knowledge-based mapping rules may be regarded as a preferred embodiment. This approach leads to a universal gateway which is suitable for—or adaptable to—any vendor specific information model. For any new machine information model, it is sufficient to update its mapping knowledge in the gateway.

Gateways in formerly known designs had to be upgraded in order to handle new protocols or data models by updating the code or firmware. This updating involved an implementation of new parsers each time a new input model was to be adapted to. Moreover, the code for mapping and serialization in desired output models needed to be changed or amended.

The example gateways mitigate these intricacies in that the execution side of the gateway—the right-hand side of FIG. 2—does not need to be changed. Implementing a new vendor-specific model merely involves adding a mapping knowledge. A mapping knowledge functionality—according to the left-hand side of FIG. 2—may generate mapping knowledge offline or concurrently with the regular operation of the gateway. The mapping knowledge may be generated either by humans or/and with automated methods using by artificial intelligence.

For the creation of mapping knowledge, a low-code platform may be used, whereby the low-code platform may be made accessible by a server on a cloud level. This approach grants wider options for easing a creation or modification of existing mapping knowledge. The low-code platform particularly allows developers to concentrate on a high-level mapping performed with a graphic user interface and, at the same time, freeing the developer from the presently necessary practice of coding embedded software for a hardware-constrained IoT gateway. Although more complex cases may still require particular transformation functions, developing these functions in a low-code environment is more time-effective than in an embedded software environment.

Figures 3, 4:
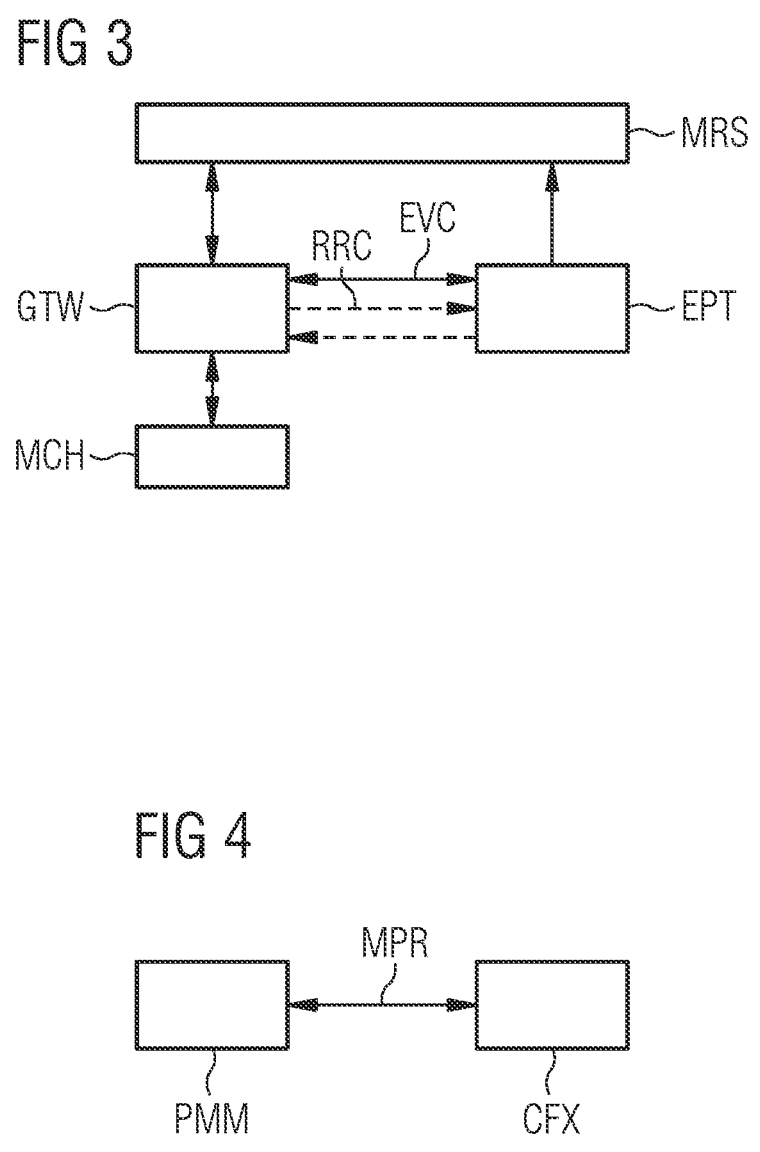

Turning now to FIG. 3 illustrating an exemplary industrial communication environment, in which the gateway GTW or knowledge-Based IoT Gateway GTW according to the present embodiments may act in a »plug-and-play« fashion. This may include the gateway GTW being connected to a machine MCH on a shopfloor, reading its data, and mapping the data to an industrial information model for automation purposes such as a IPC-CFX information model. Mapped data, including exchanged messages, may be accessed in a standard way, e.g., via a message routing system MRS. The gateway GTW may publish messages or events or generally exchange messages or events with the message routing system MRS—see the vertical double arrow in the drawing. In some embodiments, the gateway GTW may exchange messages or events with an endpoint EPT. The endpoint may be a field device or any other machine or device. The exchange of messages or events may be transported over a dedicated event channel EVC or a request/response channel RRC.

The gateway GTW may publish messages or events over the event channel EVC to the message routing system MRS and subscribe to events from other IPC-CFX Endpoints EPT. The IPC-CFX endpoint EPT may be an IPC-CFX compliant machine or another knowledge-based IoT Gateway GTW connected to a brownfield machine.

The bidirectional exchange or communication may, in the case of the IPC-CFX standard, be realized by an Advanced Message Queuing Protocol or AMQP protocol. The gateway GTW may also communicate with other IPC-CFX Endpoints over the Request/Response channel RRC using a Request/Response paradigm.

Referring now to FIG. 4 the objective of transforming or mapping rules is illustrated in general. As shown, mapping rules—illustrated as a double arrow—provide a mapping between a communication protocol of a manufacturing process equipment—which may be proprietary machine Model PMM—into a standardized industrial information model for automation purposes—which may be an IPC-CFX information Model CFX. Mapping Rules achieve the task of mapping each term from the input model PMM into a specific term or a series of specific terms of the output model CFX. For the process of knowledge-based mapping a Mapping Rule Base MKB is used, the details of which will be described further down below.

A mapping of information models according to the present embodiments is based on one or more declarative logic rules or facts for applying a deductive inference mechanism. In the following, a deductive inference method is described using Datalog as one exemplary programming language for expressing said declarative logic rules.

A Datalog language section—also referred to as a Datalog program—consists of declarative rules. A rule has a rule body and a rule head, which is expressed as:

$$head{<}{=}body$$

If a Datalog system can proof that body is TRUE—as a Boolean TRUE—then it can infer that the head is TRUE as well. This is a mechanism how a Datalog system can derive new knowledge from existing knowledge.

Further on, Datalog programs and Datalog rules are built up from atomic formulas of a type:

$$p(t1, t2, \ldots, tn)$$

wherein p is a predicate symbol and t1, t2, . . . , tn denote terms. Some predicates have predefined meaning in a Datalog system. They denote a built-in operation, and thus are called built-in predicates. In anticipation of embodiments to be described further down below, built-in predicates and compound terms may be used to handle external calls or functions, which may be used to map methods and commands of the proprietary communication protocol of the manufacturing process equipment into IPC-CFX methods or may be used for mathematical operations, e.g., for data mapping. Further on, built-in predicates and compound terms may be used to call or execute methods and commands specified in the communication protocol.

Returning back to the description of Datalog, an atomic formula—or short: an atom—is a formula that cannot be divided into strict sub-formulas. Literals are positive or negative atoms. Terms are constants, variables, or compound terms. Variables are denoted with strings consisting of capital letters or beginning with a capital letter—e.g., VAR or Var—and constants are quoted, e.g., »constant_unit«. Compound terms implement functions. A function is an expression of a type:

$$f(t1, t2, \ldots, tn)$$

wherein f is a function symbol of arity n, and t1, t2, . . . , tn are terms. A fact is a ground atomic formula, e.g. expressed by:

$$p(\text{"}c1\text{"}, \text{"}c2\text{"}, \ldots, \text{"}cn\text{"})$$

wherein "c1","c2", . . . ,"cn" are constants.

Figure 5:
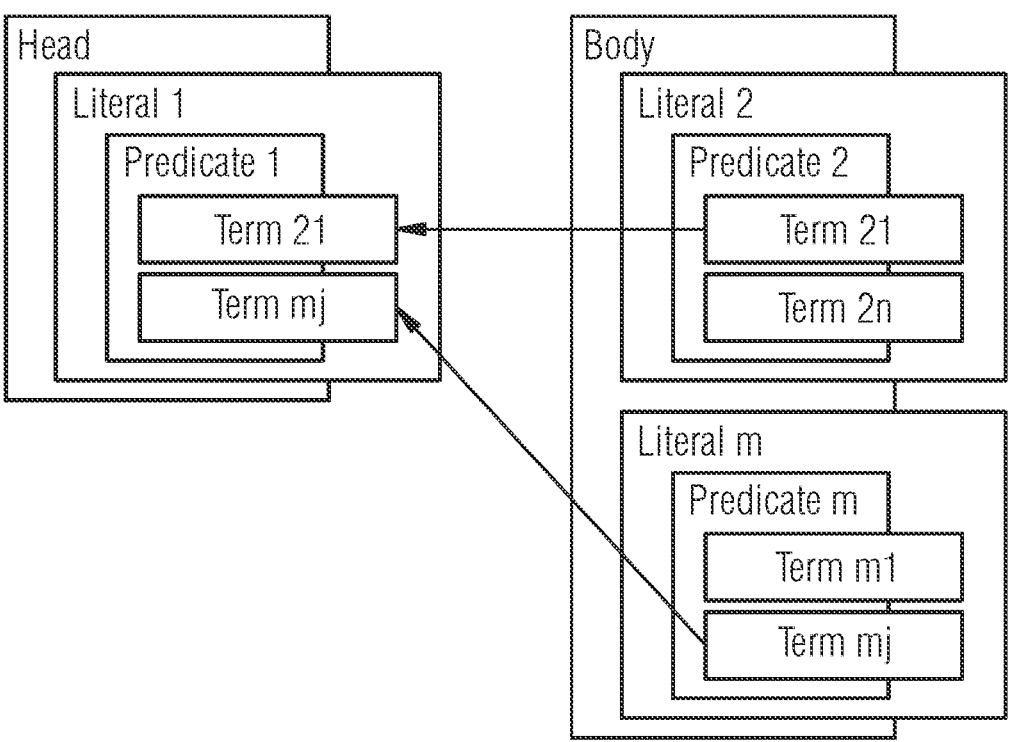
FIG. 5: is a block diagram illustrating declarative logic rule applied to declarative logic facts incorporating teachings of the present disclosure.

FIG. 5 shows a graphical representation of a declarative logic rule applied to declarative logic facts with the aim of mapping data from one information model to another one. It can be seen that terms in the Body literal—right side of FIG. 5—are related to terms in the head atom—left side of FIG. 5. In this case, upon input of a single fact matching the structure of the body literal, a Datalog fact will be deduced using the inputted fact and the existing Datalog rule.

Datalog rules can be constructed in such a way that they recursively work with each other to populate complete mapping rules using many individuals, and smaller Datalog rules that define information relationships. As such, in the example, a new Datalog fact with the format of the rule head will be asserted into the database if there are literals matching the body literals' constant terms with the terms also being satisfied as wildcards.

Figure 6:
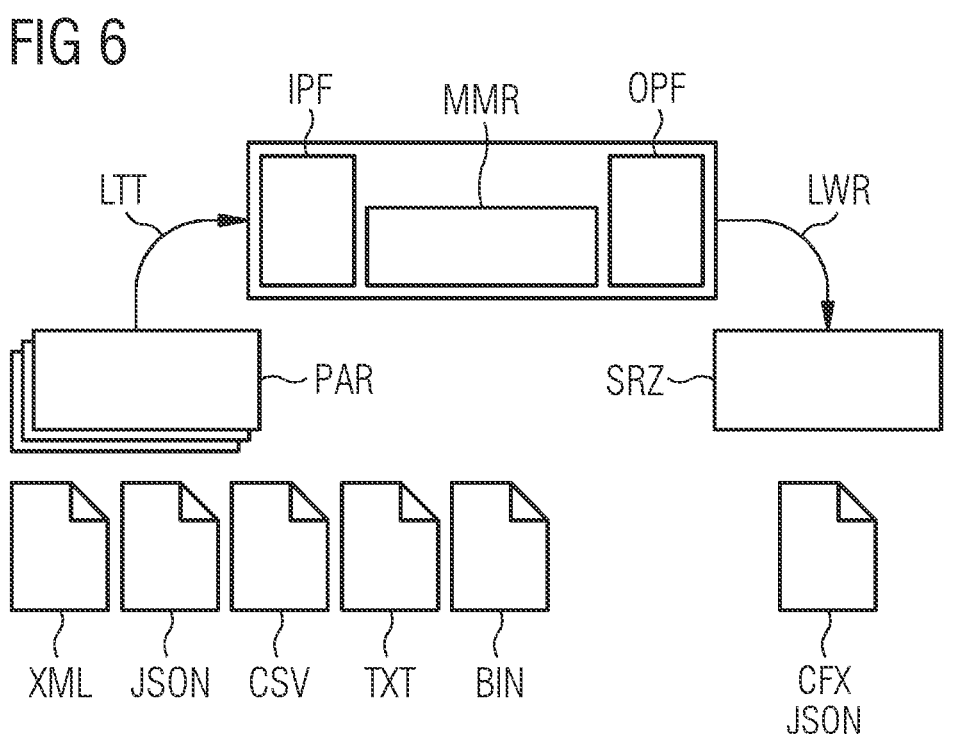
FIG. 6: is a block diagram illustrating a transformation of a data model of a manufacturing process equipment into executable knowledge-based mapping rules.

FIG. 6 illustrates a transformation of a data model of a manufacturing process equipment into executable knowledge-based mapping rules. In an overarching summary, FIG. 6 depicts a concept for mapping a data model of a manufacturing process equipment as shown in the lower left of FIG. 6 into a standardized industrial information model for automation purposes on the lower right of FIG. 6.

The data model of the manufacturing process equipment may be specified by a plurality of possible different model data—in the drawing respectively symbolized by a respective paper document with a folded corner—which may be specified in different serialization formats, e.g., XML (Extensible Markup Language), JSON (JSON or JavaScript Object Notation), CSV (Comma-separated Values Format), TXT (Text Format), BIN (Binary Format), etc.

A parser or a parsing process PAR may be provided for one or more of said distinguished serialization formats XML, JSON, CSV, TXT, BIN or binary etc. The parsing process PAR may provide a declarative language for selecting and navigating nodes in an input document or message. For example, if XML is used as an input, an expression language XPath may be used for navigating nodes in the serialization format and for extracting the content which has to be mapped. Alternatively, if an input model data is written in JSON, an expression language JSONPath may be used.

In a procedure which is named as lifting LFT, input facts IPF are generated from the outcome of this parsing process PAR.

Applying one or more declarative mapping rules MMR, the Input Facts IPF are then mapped into Output Facts OPF. The declarative mapping rules MMR may be specific IPC-CFX declarative mapping rules MMR as described above which means that these declarative mapping rules MMR are defined with respect to a IPC-CFX Model. Since this IPC-CFX Model or any other Model in general is standardized, it does not need to be changed when the input changes, e.g., for the case that another machine vendor is considered. The declarative mapping rules MMR may be, however, specific with respect to the Input Facts IPF.

The procedure for transforming the Output Facts OPF into a serialized executable code SRZ—such as CFX JSON as exemplarily depicted in the drawing—is denoted as a lowering process LWR. In case a complete collection of input facts IPF and mapping rules is processed, a complete IPC-CFX message results.

In the following, an example of a vendor-specific message as shown in Appendix 1 is considered. The content of the whole message can be extracted with the following lines of XPath expressions:

//RECEIVED/REHM/TRACE/CHANNELS channelattributes.facts

//RECEIVED/REHM/TRACE/CHANNELS/* channel.facts

//RECEIVED/REHM/TRACE trace.facts

//RECEIVED/REHM rehm.facts

//RECEIVED receivedtime.facts

Along these XPath expressions, the parsing process PAR may also expect names of files in which the content may be extracted to (e.g., channel.facts, trace.facts, received time.facts etc.). This procedure will generate Input Facts IPF. For example, for a file entitled channel.facts the following content will be produced

| | | | | | | |
|---|---|---|---|---|---|---|
| O2Analyse | 101 | 100 | 0 | 350 | 100 | OK |
| DriveL1 | 752 | 748 | 740 | 760 | 750 | OK |
| HtBottomZ01 | 131 | 131 | 125 | 140 | 130 | OK |
| HtTopZ01 | 131 | 131 | 125 | 140 | 130 | OK |
| MonZ01 | 124 | 124 | 120 | 140 | 130 | OK |
| HtBottomZ02 | 146 | 146 | 140 | 150 | 145 | OK |
| HtTopZ02 | 146 | 146 | 140 | 150 | 145 | OK |
| MonZ02 | 143 | 143 | 135 | 150 | 145 | OK |
| HtBottomZ03 | 160 | 160 | 155 | 165 | 160 | OK |
| HtTopZ03 | 160 | 160 | 155 | 165 | 160 | OK |
| . . . | | | | | | |

Consequently, Input Facts IPF may to be mapped into Output Facts OPF. This may be accomplished with declarative mapping rules MMR. The declarative mapping rules MMR may be defined with respect to a IPC-CFX Model. Since the IPC-CFX Model is standardized, it may not need to be changed when the input changes. The declarative mapping rules MMR may be, however, specifically chosen with respect to the Input Facts IPF. An example of declarative mapping rules MMR is shown below:

```
.decl detectTag(channel_tag_name : symbol, tag_identifier:symbol)
detectTag("HtBottomZ01", "Z01").
detectTag("HtBottomZ02", "Z02").
detectTag("HtBottomZ03", "Z03").
...
```

The declarative mapping rules MMR may be understood as a mapping table. In a first line as shown above, a table header is declared. The rest of the lines of the declarative mapping rules MMR as shown above define table rows. In Datalog terminology, these table rows may be denoted as Literals as depicted in FIG. and described above in connection with FIG. 5. The meaning of each row is as follows: Whenever a tag »HtBottomZ01« is detected, it will be mapped to »Z01«. Further, whenever such a mapping is required, a predicate »detectTag« will be used in a rule.

While usually as many mapping tables are needed as there are XPath expressions in the input message, the various embodiments described herein achieve significantly less expenditure. This is due to the usage of a graphical interface, implemented by a low-code approach, in order to easily define these mapping tables. It is worth noting, that a user does not need to write the code or embedded code. A simple mapping in a form of statements: map »HtBottomZ01« into »Z01« may be sufficient.

The defined mapping tables are used further with Mapping Rules and IPC-CFX Model that are implemented in Datalog. A rule example is shown below:

```
SetPoints(tag_identifier, SubZone, SetpointType, n_setValue)
:- channel(channel_tag_name,n_maxValue, n_minValue, n_toleranceBottom, n_toleranceTop,
n_setValue          ,s_state),          detectTag(channel_tag_name,          tag_identifier),
SubZone_identifier(rehm_tag_name,     SubZone)     ,     SetPoint_identifier(tag_identifier,
SetpointType).
```

This rule may produce a Predicate »SetPoints« with Terms »tag_identifier«,»SubZone«,»SetpointType«,»n setValue«. Said predicates and terms are all defined by the IPC-CFX standard. In the rule body—the part stated after the sign »:—«—Literals may have to be provided for feeding the input content. For example, in a previous step the predicate »detectTag« with Terms »channel_tag_name« and »tag_identifier« may have been provided.

The rule as depicted above has obviously used this Literals. In this way, all terminology from a standard information model—e.g., an IPC-CFX model—may be declared and a mapping from an input model may be provided. Such a procedure eventually generates the Output Facts OPF.

In a subsequent serialization process completing the lowering procedure, the Output Facts OPF are fed in a serialized executable code SRZ such as JSON template for IPC-CFX as shown below:

```
set_points["SubZone"]     = setpoints_subzone;
        set_points["SetpointType"] = setpointtype;
        set_points["Setpoint"]    = setpoints_setpoint;
        zone_datas["SetPoints"].push_back(set_points);
```

The IPC-CFX template may be fixed. Thus, the procedure may be implemented once in a procedural way. The output is a valid IPC-CFX snippet as shown below:

```
"SetPoints": [
        {
            "Setpoint": 130.0,
            "SetpointType": "Temperature",
            "SubZone": "Bottom"
        },
        {
            "Setpoint": 130.0,
            "SetpointType": "Temperature",
            "SubZone": "Top"
        }
    ]
```

The overall procedure to obtain a valid IPC-CFX message from Output Facts is denoted as Lowering in FIG. 6. Processing all Input Facts IPF and Mapping Rules MMR will result in a complete IPC-CFX message. As an example, for the exemplary input provided in Appendix 1, an exemplary IPC-CFX output as provided in Appendix 2 will be obtained.

A code snippet below—in the description also referred to as »Appendix 1«—shows an example input message according to a data model of a manufacturing process equipment:

<?xml version="1.0" encoding="utf-8"?>
<REHM>
<RECEIVED time="2021-06-24T13:13:24.383+02:00">
  <REHM s_name="P2319" s_type="VXP+" n_id="1109">
    <TRACE        s_serialNo="ZAAA8028"        n_lane="1"        s_lot="ZAAA8028"
    s_program="433_Smartfield-Device_B"
    s_revision="2021-06-24T06:38:46+00:00"
    n_processingTime="490">
    <CHANNELS n_count="33" s_state="OK">
      <O2Analyse      n_maxValue="101"      n_minValue="100"      n_toleranceBottom="0"
        n_toleranceTop="350" n_setValue="100" s_state="OK" />
      <DriveL1      n_maxValue="752"      n_minValue="748"      n_toleranceBottom="740"
        n_toleranceTop="760" n_setValue="750" s_state="OK" />
      <HtBottomZ01      n_maxValue="131"   n_minValue="131"   n_toleranceBottom="125"
        n_toleranceTop="140" n_setValue="130" s_state="OK" />
      <HtTopZ01      n_maxValue="131"   n_minValue="131"   n_toleranceBottom="125"
        n_toleranceTop="140" n_setValue="130" s_state="OK" />
      <MonZ01      n_maxValue="124"      n_minValue="124"      n_toleranceBottom="120"
        n_toleranceTop="140" n_setValue="130" s_state="OK" />
      <HtBottomZ02      n_maxValue="146"   n_minValue="146"   n_toleranceBottom="140"
        n_toleranceTop="150" n_setValue="145" s_state="OK" />
      <HtTopZ02      n_maxValue="146"   n_minValue="146"   n_toleranceBottom="140"
        n_toleranceTop="150" n_setValue="145" s_state="OK" />
      <MonZ02      n_maxValue="143"      n_minValue="143"      n_toleranceBottom="135"
        n_toleranceTop="150" n_setValue="145" s_state="OK" />
      <HtBottomZ03      n_maxValue="160"   n_minValue="160"   n_toleranceBottom="155"
        n_toleranceTop="165" n_setValue="160" s_state="OK" />
      <HtTopZ03      n_maxValue="160"   n_minValue="160"   n_toleranceBottom="155"
        n_toleranceTop="165" n_setValue="160" s_state="OK" />
      <MonZ03      n_maxValue="158"      n_minValue="158"      n_toleranceBottom="150"
        n_toleranceTop="165" n_setValue="160" s_state="OK" />
      <HtBottomZ04      n_maxValue="170"   n_minValue="170"   n_toleranceBottom="165"
        n_toleranceTop="175" n_setValue="170" s_state="OK" />
      <HtTopZ04      n_maxValue="170"   n_minValue="170"   n_toleranceBottom="165"
        n_toleranceTop="175" n_setValue="170" s_state="OK" />
      <MonZ04      n_maxValue="169"      n_minValue="169"      n_toleranceBottom="160"
        n_toleranceTop="175" n_setValue="170" s_state="OK" />
      <HtBottomZ05      n_maxValue="51"   n_minValue="51"   n_toleranceBottom="200"
        n_toleranceTop="220" n_setValue="210" s_state="OK" />
      <HtTopZ05      n_maxValue="183"   n_minValue="183"   n_toleranceBottom="175"
        n_toleranceTop="185" n_setValue="180" s_state="OK" />
      <MonZ05      n_maxValue="184"      n_minValue="184"      n_toleranceBottom="170"
        n_toleranceTop="190" n_setValue="180" s_state="OK" />
      <HtBottomZ06      n_maxValue="211"   n_minValue="211"   n_toleranceBottom="205"
        n_toleranceTop="215" n_setValue="210" s_state="OK" />
      <HtTopZ06      n_maxValue="210"   n_minValue="210"   n_toleranceBottom="205"
        n_toleranceTop="215" n_setValue="210" s_state="OK" />
      <MonZ06      n_maxValue="210"      n_minValue="210"      n_toleranceBottom="200"
        n_toleranceTop="215" n_setValue="210" s_state="OK" />
      <HtBottomP1      n_maxValue="250"   n_minValue="250"   n_toleranceBottom="245"
        n_toleranceTop="255" n_setValue="250" s_state="OK" />
      <HtTopP1      n_maxValue="250"      n_minValue="250"      n_toleranceBottom="245"
        n_toleranceTop="255" n_setValue="250" s_state="OK" />
      <MonP1      n_maxValue="248"      n_minValue="248"      n_toleranceBottom="240"
        n_toleranceTop="255" n_setValue="250" s_state="OK" />
      <HtBottomP2      n_maxValue="250"   n_minValue="250"   n_toleranceBottom="245"
        n_toleranceTop="255" n_setValue="250" s_state="OK" />
      <HtTopP2      n_maxValue="250"      n_minValue="250"      n_toleranceBottom="245"
        n_toleranceTop="255" n_setValue="250" s_state="OK" />
      <MonP2      n_maxValue="247"      n_minValue="247"      n_toleranceBottom="240"
        n_toleranceTop="255" n_setValue="250" s_state="OK" />
      <HtBottomP3      n_maxValue="250"   n_minValue="250"   n_toleranceBottom="245"
        n_toleranceTop="255" n_setValue="250" s_state="OK" />
      <HtTopP3      n_maxValue="250"      n_minValue="250"      n_toleranceBottom="245"
        n_toleranceTop="255" n_setValue="250" s_state="OK" />
      <MonP3      n_maxValue="242"      n_minValue="242"      n_toleranceBottom="240"
        n_toleranceTop="255" n_setValue="250" s_state="OK" />
      <MonC1      n_maxValue="93"      _minValue="93"      n_toleranceBottom="11"
        n_toleranceTop="120" n_setValue="110" s_state="OK" />
      <MonC2      n_maxValue="25"      n_minValue="25"      n_toleranceBottom="15"
        n_toleranceTop="35" n_setValue="25" s_state="OK" />
      <MonC3      n_maxValue="24"      n_minValue="24"      n_toleranceBottom="10"
        n_toleranceTop="30" n_setValue="20" s_state="OK" />
      <MonC4      n_maxValue="23"      n_minValue="23"      n_toleranceBottom="10"
        n_toleranceTop="30" n_setValue="20" s_state="OK" />

-continued

```
    </CHANNELS>
    <SINGLES n_count="0" />
    <EVENTS n_count="0" />
    </TRACE>
    </REHM>
  </RECEIVED>
</REHM>
```

(End of »Appendix 1«)

A code snippet below—in the description also referred to as »Appendix 2«—shows an example of an output message according to the IPC-CFX information model being an example of an industrial information model for automation purposes:

```
{
  "MessageBody": {
    "CommonProcessData": {
    "ConveyorSpeed": 750.0,
    "ConveyorSpeedSetpoint": 750.0,
    "ZoneData": [
        {
          "Readings": [
            {
              "ReadingType": "Temperature",
              "ReadingValue": 131.0,
              "SubZone": "Bottom"
            },
            {
              "ReadingType": "Temperature",
              "ReadingValue": 131.0,
              "SubZone": "Top"
            }
          ],
          "SetPoints": [
            {
              "Setpoint": 130.0,
              "SetpointType": "Temperature",
              "SubZone": "Bottom"
            },
            {
              "Setpoint": 130.0,
              "SetpointType": "Temperature",
              "SubZone": "Top"
            }
          ],
          "Zone": {
            "ReflowZoneType": "Preheat",
            "StageName": "Zone1",
            "StageSequence": 1.0,
            "StageType": "Work"
          }
        },
        {
          "Readings": [
            {
              "ReadingType": "Temperature",
              "ReadingValue": 146.0,
              "SubZone": "Bottom"
            },
            {
              "ReadingType": "Temperature",
              "ReadingValue": 146.0,
              "SubZone": "Top"
            }
          ],
          "SetPoints": [
            {
              "Setpoint": 145.0,
              "SetpointType": "Temperature",
              "SubZone": "Bottom"
            },
            {
              "Setpoint": 145.0,
              "SetpointType": "Temperature",
              "SubZone": "Top"
            }
          ],
          "Zone": {
```

```
            "ReflowZoneType": "Preheat",
            "StageName": "Zone2",
            "StageSequence": 2.0,
            "StageType": "Work"
         }
      },
      {
         "Readings": [
            {
               "ReadingType": "Temperature",
               "ReadingValue": 160.0,
               "SubZone": "Bottom"
            },
            {
               "ReadingType": "Temperature",
               "ReadingValue": 160.0,
               "SubZone": "Top"
            }
         ],
         "SetPoints": [
            {
               "Setpoint": 160.0,
               "SetpointType": "Temperature",
               "SubZone": "Bottom"
            },
            {
               "Setpoint": 160.0,
               "SetpointType": "Temperature",
               "SubZone": "Top"
            }
         ],
         "Zone": {
            "ReflowZoneType": "Preheat",
            "StageName": "Zone3",
            "StageSequence": 3.0,
            "StageType": "Work"
         },
      },
      {
         "Readings": [
            {
               "ReadingType": "Temperature",
               "ReadingValue": 170.0,
               "SubZone": "Bottom"
            },
            {
               "ReadingType": "Temperature",
               "ReadingValue": 170.0,
               "SubZone": "Top"
            }
         ],
         "SetPoints": [
            {
               "Setpoint": 170.0,
               "SetpointType": "Temperature",
               "SubZone": "Bottom"
            },
            {
               "Setpoint": 170.0,
               "SetpointType": "Temperature",
               "SubZone": "Top"
            }
         ],
         "Zone": {
            "ReflowZoneType": "Preheat",
            "StageName": "Zone4",
            "StageSequence": 4.0,
            "StageType": "Work"
         }
      },
      {
         "Readings": [
            {
               "ReadingType": "Temperature",
               "ReadingValue": 51.0,
               "SubZone": "Bottom"
            },
            {
               "ReadingType": "Temperature",
```

```
            "ReadingValue": 183.0,
            "SubZone": "Bottom"
        }
    ],
    "SetPoints": [
        {
            "Setpoint": 180.0,
            "SetpointType": "Temperature",
            "SubZone": "Bottom"
        },
        {
            "Setpoint": 180.0,
            "SetpointType": "Temperature",
            "SubZone": "Bottom"
        }
    ],
    "Zone": {
        "ReflowZoneType": "Preheat",
        "StageName": "Zone5",
        "StageSequence": 5.0,
        "StageType": "Work"
    }
},
{
    "Readings": [
        {
            "ReadingType": "Temperature",
            "ReadingValue": 51.0,
            "SubZone": "Bottom"
        },
        {
            "ReadingType": "Temperature",
            "ReadingValue": 183.0,
            "SubZone": "Bottom"
        }
    ],
    "SetPoints": [
        {
            "Setpoint": 210.0,
            "SetpointType": "Temperature",
            "SubZone": "Bottom"
        },
        {
            "Setpoint": 210.0,
            "SetpointType": "Temperature",
            "SubZone": "Bottom"
        }
    ],
    "Zone": {
        "ReflowZoneType": "Preheat",
        "StageName": "Zone5",
        "StageSequence": 5.0,
        "StageType": "Work"
    }
},
{
    "Readings": [
        {
            "ReadingType": "Temperature",
            "ReadingValue": 51.0,
            "SubZone": "Top"
        },
        {
            "ReadingType": "Temperature",
            "ReadingValue": 183.0,
            "SubZone": "Top"
        }
    ],
    "SetPoints": [
        {
            "Setpoint": 180.0,
            "SetpointType": "Temperature",
            "SubZone": "Top"
        },
        {
            "Setpoint": 180.0,
            "SetpointType": "Temperature",
            "SubZone": "Top"
        }
```

```
    ],
    "Zone": {
      "ReflowZoneType": "Preheat",
      "StageName": "Zone5",
      "StageSequence": 5.0,
      "StageType": "Work"
    }
  },
  {
    "Readings": [
      {
        "ReadingType": "Temperature",
        "ReadingValue": 51.0,
        "SubZone": "Top"
      },
      {
        "ReadingType": "Temperature",
        "ReadingValue": 183.0,
        "SubZone": "Top"
      }
    ],
    "SetPoints": [
      {
        "Setpoint": 210.0,
        "SetpointType": "Temperature",
        "SubZone": "Top"
      },
      {
        "Setpoint": 210.0,
        "SetpointType": "Temperature",
        "SubZone": "Top"
      }
    ],
    "Zone": {
      "ReflowZoneType": "Preheat",
      "StageName": "Zone5",
      "StageSequence": 5.0,
      "StageType": "Work"
    }
  },
  {
    "Readings": [
      {
        "ReadingType": "Temperature",
        "ReadingValue": 210.0,
        "SubZone": "Bottom"
      },
      {
        "ReadingType": "Temperature",
        "ReadingValue": 211.0,
        "SubZone": "Bottom"
      }
    ],
    "SetPoints": [
      {
        "Setpoint": 210.0,
        "SetpointType": "Temperature",
        "SubZone": "Bottom"
      },
      {
        "Setpoint": 210.0,
        "SetpointType": "Temperature",
        "SubZone": "Bottom"
      }
    ],
    "Zone": {
      "ReflowZoneType": "Preheat",
      "StageName": "Zone6",
      "StageSequence": 6.0,
      "StageType": "Work"
    }
  },
  {
    "Readings": [
      {
        "ReadingType": "Temperature",
        "ReadingValue": 210.0,
        "SubZone": "Top"
      },
```

-continued

```
          {
              "ReadingType": "Temperature",
              "ReadingValue": 211.0,
              "SubZone": "Top"
          }
      ],
      "SetPoints": [
          {
              "Setpoint": 210.0,
              "SetpointType": "Temperature",
              "SubZone": "Top"
          },
          {
              "Setpoint": 210.0,
              "SetpointType": "Temperature",
              "SubZone": "Top"
          }
      ],
      "Zone": {
          "ReflowZoneType": "Preheat",
          "StageName": "Zone6",
          "StageSequence": 6.0,
          "StageType": "Work"
      }
    }
  ],
  "type": "CFX. Structures. SolderReflow. ReflowProcessData, CFX"
},
"OverallResult": "Succeeded",
"TransactionId": "59e69b5e-0c78-4e01-acef-fef2a064737f",
"type": "CFX.Production.Processing.UnitsProcessed, CFX"
},
"MessageName" : "CFX.Production.Processing.UnitsProcessed",
"RequestID": null,
"Source": "P2319VXP+",
"Target": null,
"TimeStamp": "2021-06-24T13:13:24.383+02:00",
"UniqueID": "xxxx",
"Version": "1.2"
}
```

(End of »Appendix 2«)

The various embodiments enable a transformation of an existing and/or proprietary data model of a machine vendor into a standardized IPC-CFX information model or any other standardized industrial information model for automation purposes. The present embodiments may be particularly advantageous for implementations on low-cost hardware or gateways with limited resources.

The various embodiments are flexible and general in that they work for any (proprietary) data model of a machine vendor. Based on a declarative semantic mapping—which may be generated either by humans or/and with methods provided by artificial Intelligence—their simple deployment surpasses the known machine-level implementations while the proposed embodiments, at the same time, accomplish the processing speed of known machine-level implementations due to the benefits of the proposed transformation of the declarative mapping rules into executable knowledge-based mapping rules executed in a runtime environment of the gateway.

Accordingly, the various embodiments are cheaper in terms of realization and maintenance not least because the mapping rules may be easily sent to potentially many gateways. In the same vein, they may be effortlessly deleted, thereby enabling an easy management of such declarative gateways as proposed.

In summary, the various embodiments are characterized by a two-fold approach according to FIG. 2. While a first unit of the proposed gateway as shown on the left side of FIG. 2 is used to generate mapping knowledge, a second unit shown on the right side of FIG. 2 implements the actual gateway functionality. Such a design is driven by the objective underlying the present embodiments of realizing a universal gateway in a sense that its code does not need to be updated when a new vendor specific model is to be handled.

The gateway functionality as shown on the right side of FIG. 2 may be implemented by constrained hardware, thereby advantageously avoiding a need for changing software or embedded software driving the gateway functionality. Such changes or amendments to the software may be processed in the first unit of the proposed gateway as shown on the left side of FIG. 2 used to generate mapping knowledge. This part may be implemented on a non-constrained hardware, e.g., in the cloud.

The two-fold approach offers more possibilities to efficiently create the mapping information. In particular, the proposed embodiments follow a declarative approach wherein the mapping statements are declared. These kind of declared mappings are highly suitable for realizations with a low-code approach. Moreover, a low-code platform may also provide a concurrent validation of mapped statements, configuration options, a monitoring service for input and output message streams, scheduling etc.

The elements and features recited in the appended claims may be combined in different ways to produce new claims that likewise fall within the scope of the present disclosure. Thus, whereas the dependent claims appended below depend from only a single independent or dependent claim, it is to be understood that these dependent claims can, alternatively, be made to depend in the alternative from any preceding or following claim, whether independent or dependent, and that such new combinations are to be understood as forming a part of the present specification.

While the teachings of the present disclosure are described above by reference to various embodiments, it should be understood that many changes and modifications can be made to the described embodiments. It is therefore intended that the foregoing description be regarded as illustrative rather than limiting, and that it be understood that all equivalents and/or combinations of embodiments are intended to be included in this description.

The invention claimed is:

1. A gateway for transforming a data model of a multiplicity of manufacturing process equipment into an industrial information model for automation purposes, the gateway comprising:

one or more processors for executing a set of modules;

a communication channel connecting the one or more processors to the multiplicity of manufacturing process equipment;

the set of modules including:

a parsing module for parsing information entities in the data model of the manufacturing process equipment by applying a communication protocol of the data model;

a semantic mapping engine for transforming the information entities into the industrial information model, wherein the semantic mapping engine uses a runtime environment to execute a set of knowledge-based mapping rules;

an interface module for providing access to the industrial information model;

a mapping knowledge unit including a mapping rule base for maintaining one or more declarative mapping rules; and a mapping compiler for transforming the declarative mapping rules into executable code, for compiling the executable code into the set of knowledge-based mapping rules and for feeding the set of knowledge-based mapping rules into the runtime environment of the semantic mapping engine.

2. The gateway according to claim 1, wherein the mapping knowledge unit includes a generation module for generating or assisting a generation of mapping knowledge by artificial intelligence and/or by human operators.

3. The gateway according to claim 1, wherein the mapping knowledge unit includes a mapping knowledge transformation module for transforming the mapping knowledge into declarative logic facts and for asserting the declarative logic facts within a deductive database.

4. The gateway according to claim 1, wherein the mapping knowledge unit includes a transformation unit for transforming the parsed information entities into declarative logic facts and for asserting the declarative logic facts within a deductive database.

5. The method according to claim 1, wherein the industrial information model comprises IPC-CFX or OPC UA.

6. A method for transforming a data model of a multiplicity of manufacturing process equipment into an industrial information model for automation purposes, the method comprising:

parsing information entities in the data model of the multiplicity of manufacturing process equipment by applying a communication protocol of the data model;

transforming the information entities into the industrial information model using a runtime environment to execute a set of knowledge-based mapping rules;

providing access to the industrial information model by an interface module;

maintaining one or more declarative mapping rules by a mapping rule base; and transforming the declarative mapping rules into executable code, compiling the executable code into the set of knowledge-based mapping rules, and feeding the set of knowledge-based mapping rules into the runtime environment of a semantic mapping engine.

* * * * *